June 19, 1956  F. J. REITER  2,751,098
VEHICLE MOUNTED GRAIN MIXER AND CONVEYOR
Filed Dec. 2, 1954
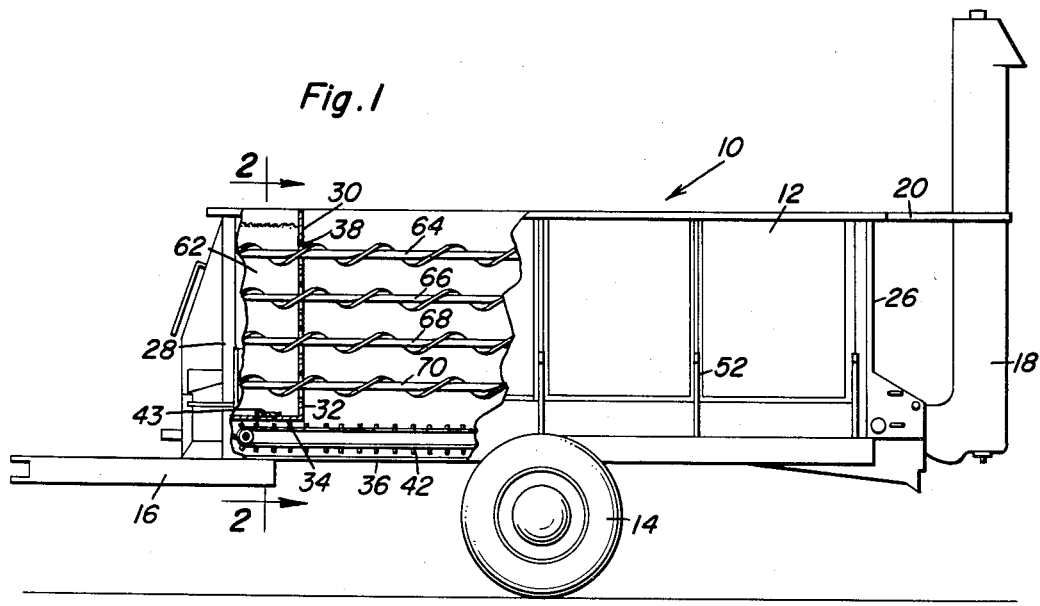
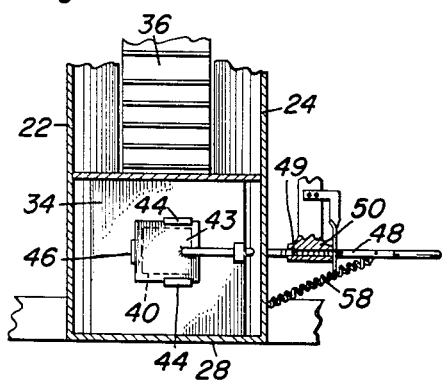
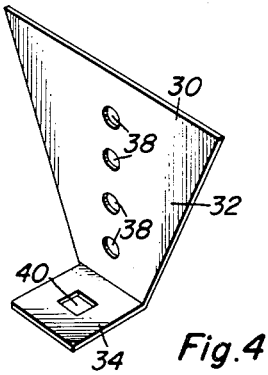
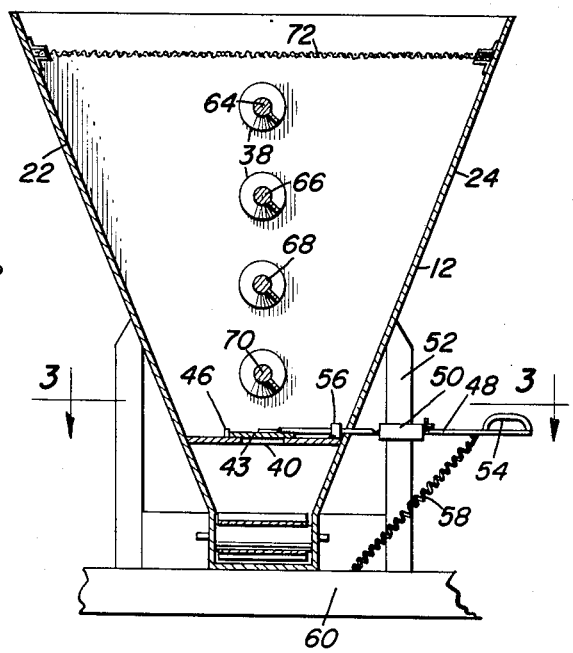
Fred J. Reiter
INVENTOR.

2,751,098

VEHICLE MOUNTED GRAIN MIXER AND CONVEYOR

Fred J. Reiter, Cascade, Iowa

Application December 2, 1954, Serial No. 472,568

2 Claims. (Cl. 214—83.14)

This invention relates generally to agricultural equipment and more particularly to an attachment for a grain conveyor or other material handling vehicle which is adapted to unload forage such as crushed or shelled corn, or the like.

The primary object of the present invention resides in the provision of an improved material handling vehicle which will deliver a desired quantity of oil meal mixed with crushed or shelled corn for feeding cattle.

A further object of the invention resides in the provision of means for adjusting the rate of flow of oil meal into a container filled with crushed or shelled corn or the like while also providing a compartment for the oil meal.

Still further objects of the invention reside in the provision of a material handling vehicle which is adapted to discharge the material at a controlled rate from the vehicle without any clogging of the discharging chute or opening and in which there is provided feed augers which serve as agitating devices for mixing oil meal with crushed corn and the like thereby providing a highly desirable mixed feed for cattle and the like.

These, together with the various ancillary objects and features of the invention which will become apparent as the following description proceeds, are attained by this attachment for a grain conveyor, a preferred embodiment of which has been illustrated in the accompanying drawings, by way of example only, wherein:

Figure 1 is a side elevational view of a grain conveyor with parts thereof being broken away to show the invention in detail;

Figure 2 is an enlarged vertical sectional view as taken along the plane of line 2—2 in Figure 1;

Figure 3 is a horizontal sectional detail view as taken along the plane of line 3—3 in Figure 1 and illustrating the construction of the trapdoor and operating means therefor; and Figure 4 is a perspective view of the partition which is installed in the grain conveyor for forming the compartment for oil meal.

With continuing reference to the accompanying drawings wherein like reference numerals designate similar parts throughout the various views, reference numeral 10 generally designates a grain conveyor comprising a vehicle having a body 12 mounted on wheels 14 and provided with a drawbar or tongue 16 for attachment to a suitable towing vehicle for towing of the grain conveyor from one location to another. A discharge chute 18 is pivotally mounted adjacent the rear end of the vehicle body 12 in alignment with an opening therein and is held in a raised position by means of a bracket 20 during movement of the grain conveyor 10, the chute 18 being lowered into alignment with a trough or the like when it is desired to discharge feed from the vehicle 10 into the trough.

As is seen best in Figure 2, the vehicle body 12 includes upwardly divergent side walls 22 and 24 and the chute 18 is mounted adjacent an opening in one end wall thereof. Adjacent the other end wall of the vehicle body 12, the end walls being indicated by reference numerals 26 and 28 respectively there is secured as by welding or other suitable means a suitable partition 30 which includes a vertical section 32 and a horizontal section 34. The vertical section 32 is preferably welded to the side walls 22 and 24 of the vehicle body 12 while the horizontal portion 34 is secured to the side walls 22 and 24 but spaced from the bottom wall 36 of the vehicle body 12. The partition 30 is provided with a series of vertically spaced apertures 38 therethrough and the horizontal portion 34 is provided with an opening 40 therethrough. Mounted below the horizontal portion 34 and in alignment with the opening 40 is an endless belt conveyor 42 or like conveyor. A plate 43 constrained for horizontal movement on the horizontal portion 34 and adapted to close the opening 40 is provided and the guides 44 are provided for receiving and constraining the movement of the plate 43. A stop 46 may be provided for limiting the position of the plate 43 as may be desired.

Attached to the plate 43 is an operating rod 48 which extends through the side wall 24 of the vehicle body 12 and which is also engaged in a substantially cylindrical support 50 carried by one of the braces as at 52 of the body 12 of the grain conveyor 10. The handle 48 may be notched as at 49 to provide means for ensuring that opening 40 can be kept constant after having been regulated. A handle 54 is provided for the operating rod 48 and a bearing 56 is provided within the body 12 through which the rod 48 slides for constraining the movement of the rod 48. A coil spring 58 is terminally secured to the rod 48 and to the base 60 of the grain conveyor so that the plate 43 which serves as a trapdoor is continuously urged into engagement with the stop 46 to therefore position the plate 43 over the opening 40. In this manner, oil meal contained within the compartment 62 formed by the end wall 28 and the partition 32 as well as the portions of the side walls 22 and 24 can be fed onto the conveyor 42 when the trapdoor 43 is in an open position.

A plurality of augers 64, 66, 68 and 70 are arranged in vertically spaced relationship within the body 12 and are journaled in the end walls 28 and 26 and extend through the apertures 38 in the partition 30. These augers serve to admix the shelled or crushed corn or like feed in the container formed by the vehicle body 12 with oil meal delivered from the compartment 62. It is to be noted that the operation of the augers will serve to adequately mix the feed and deliver it to the chute 18 together with the selected additional amounts of the oil meal delivered by the conveyor 42 to the chute 18.

A screen 72 may be provided covering the compartment 62.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A material handling vehicle comprising a material container with a first end wall, a second end wall and a bottom wall, a discharge opening in said first end wall, a conveyor adjacent the bottom wall of said container, a partition in said container spaced from said second end wall and spaced from said bottom wall forming a compartment in conjunction with said second end wall, and means in said partition for permitting flow of material from said compartment onto said conveyor, said partition having an opening therethrough, said means including a trapdoor mounted for horizontal sliding movement on said partition, and adapted to close said opening, resilient means for urging said trapdoor to a closed position, and auger conveyor means rotatably supported between said first and second walls and extending through said partition.

2. A material handling vehicle comprising a material container with a first end wall, a second end wall and a bottom wall, a discharge opening in said first end wall, a conveyor adjacent the bottom wall of said container, a partition in said container spaced from said second end wall and spaced from said bottom wall forming a compartment in conjunction with said second end wall, and means in said partition for permitting flow of material from said compartment onto said conveyor, said partition having an opening therethrough, said means including a trapdoor mounted for horizontal sliding movement on said partition, and adapted to close said opening, and resilient means for urging said trapdoor to a closed position, said container having a plurality of vertically spaced augers rotatably supported in said end walls, said partition having apertures therethrough, said augers extending through said apertures.

References Cited in the file of this patent

UNITED STATES PATENTS

| | | |
|---|---|---|
| 1,457,325 | Thatcher | June 5, 1923 |
| 1,855,828 | Flynn | Apr. 26, 1932 |
| 2,081,552 | Myers | May 25, 1937 |
| 2,573,193 | Goldsberry | Oct. 30, 1951 |
| 2,676,721 | Hansen | Apr. 27, 1954 |